US007496088B2

(12) United States Patent
Kouchri et al.

(10) Patent No.: US 7,496,088 B2
(45) Date of Patent: Feb. 24, 2009

(54) METHOD FOR ESTABLISHING A CALL IN A TELECOMMUNICATIONS NETWORK; TELECOMMUNICATIONS NETWORK; AND CONTROLLING DEVICE FOR PACKET NETWORKS

(75) Inventors: Farrokh Mohammadzadeh Kouchri, Boca Raton, FL (US); Bizhan Karimi-Cherkandi, Boca Raton, FL (US); Derek Underwood, Amherst, NH (US)

(73) Assignee: Nokia Siemens Networks GmbH Co. KG, Munich (DE)

( * ) Notice: Subject to any disclaimer, the term of this patent is extended or adjusted under 35 U.S.C. 154(b) by 0 days.

(21) Appl. No.: 10/589,212

(22) PCT Filed: Mar. 9, 2005

(86) PCT No.: PCT/EP2005/051036

§ 371 (c)(1),
(2), (4) Date: Jun. 7, 2007

(87) PCT Pub. No.: WO2005/086453

PCT Pub. Date: Sep. 15, 2005

(65) Prior Publication Data

US 2007/0274306 A1    Nov. 29, 2007

Related U.S. Application Data

(60) Provisional application No. 60/551,586, filed on Mar. 9, 2004.

(51) Int. Cl.
*H04L 12/66* (2006.01)
(52) U.S. Cl. ........................................ 370/352; 370/356

(58) Field of Classification Search ......... 381/352–356; 455/550, 560
See application file for complete search history.

(56) References Cited

U.S. PATENT DOCUMENTS

| 5,805,587 A * | 9/1998 | Norris et al. ................. 370/352 |
| 6,600,738 B1 * | 7/2003 | Alperovich et al. ......... 370/352 |
| 2003/0067903 A1 | 4/2003 | Jorgensen |
| 2003/0198216 A1 | 10/2003 | Lewis |

OTHER PUBLICATIONS

International Search Report including Notification of Transmittal of the International Search Report, International Search Report, and Written Opinion of the International Searching Authority, PCT Application No. PCT/EP2005/051036, mailed Oct. 6, 2005.

* cited by examiner

*Primary Examiner*—Suhan Ni
(74) *Attorney, Agent, or Firm*—Laurence A. Greenberg; Werner H. Stemer; Ralph E. Locher

(57) ABSTRACT

A method for establishing a call in a telecommunications network that has first and second packet network sections, a wide area packet network, and a TDM transit network section. Subscribers' terminal equipment is addressable by directory numbers, and calls to subscribers are always routed through the TDM transit network. During TDM call setup at least one message or information element is conveyed to the second packet network section which is indicative of the first terminal equipment's packet capabilities and/or an address of a first controlling device controlling the call in the first packet network section. The message or information element is received at a second controlling device controlling the call in the second packet network section. Using the information extracted from the message or information element a second connection between the first and second terminal equipment through the wide area packet network is established by the controlling devices.

16 Claims, 2 Drawing Sheets

METHOD FOR ESTABLISHING A CALL IN A TELECOMMUNICATIONS NETWORK; TELECOMMUNICATIONS NETWORK; AND CONTROLLING DEVICE FOR PACKET NETWORKS

CROSS-REFERENCE TO RELATED APPLICATIONS

This application is related to and claims the benefit of commonly-owned U.S. Provisional Patent Application No. 60/551,586, filed Mar. 9, 2004, titled "Method to Identify Calls Between Remote VoIP Subscribers Connected via a Transit PSIN and Reconnect as End-to-End VoIP" which is incorporated by reference herein in its entirety.

BACKGROUND OF THE INVENTION 1 Field of the Invention:

The present invention relates to a method for establishing a call in a telecommunications network, a telecommunications network, and a controlling device for packet networks. More particularly, the present invention relates to an optimized method, network, and device for facilitating packet network calls in mixed packet and TDM environments.

Modern communications networks generally carry two types of traffic or data. The first is the traffic which is transmitted by or delivered to a user or subscriber, and which is usually paid for by the user. That type of traffic is widely known as user traffic or subscriber traffic. The second is the traffic caused by network management applications in sending and receiving management data from network elements, known as management traffic.

In telecommunications, the management traffic is also known as signaling traffic. The term "signaling" refers to the exchange of signaling messages between various network elements such as database servers, local exchanges, transit exchanges, and user terminals. A well known protocol for transferring such signaling messages in public switched telephone networks (PSTN) is the Signaling System 7 (SS7), also referred to as Common Channel Signaling System 7 (CCS7).

The Signaling System 7 as specified by the International Telecommunication Union (ITU) in the Q.700-series standards provides for all signaling tasks in today's voice-oriented telecommunications networks. More specifically, SS7 provides for example for:

- basic call setup, management, and tear down;
- enhanced call features such as call forwarding, calling party name/number display, and automatic callback (call return);
- accounting and billing;
- database operations for services such as authentication, roaming, toll-free and special tariff services, and number portability;
- network management for the SS7 network and its connections; and
- non-call related signaling, allowing for services such as short message service (SMS), ISDN Supplementary Services and user-to-user signaling (UUS).

With the advent of "next generation" packet based telecommunications networks, and internet protocol (IP) based networks in particular, new signaling and bearer protocols were developed by the ITU and other standards bodies such as IETF, ETSI, and 3GPP.

The functional architecture of such Next Generation Networks (NGN) seeks to provide a technology independent architecture for supporting multimedia services. The intention is to support a wide range of voice, data and video services while providing inter-working with the legacy PSTN (Public Switched Telephone Network) and cellular/wireless networks, also collectively referred to as time division multiplex (TDM) networks, and/or with legacy devices.

Presently, PSTN-type, or TDM, networks dominate the voice telephony globally. While the IP based networks and their telephony applications by means of voice over IP (VoIP) protocols are expanding, the PSTN-type networks—still adequate for providing reliable voice services—will only gradually lose their dominance. It is foreseen that the two network types will coexist and inter-work in numerous ways in the next decades.

In particular, the PSTN infrastructure will dominate long distance and international calls. Consequently, many of the rules and regulations established for PSTN operations will prevail in mixed environments. This is particularly true for uniquely addressing parties or their telecommunications equipment, respectively. While IP networks are capable of various forms of addressing a called party, for example by a symbolic name such as an email address or a SIP Uniform Resource Identifier, a PSTN is only capable of handling telephone numbers as laid out in numbering plans such as the ITUT E.164 international numbering plan.

If, for example, a PSTN subscriber wishes to establish a connection to a subscriber of an IP network, the PSTN subscriber has only one way of addressing the IP subscriber, that is, by dialing digits, even though the IP subscriber may have the name dialing capability. Therefore, IP subscribers who want to be able to receive calls from PSTN subscribers need to be assigned a regular PSTN directory number.

In another example, where a PSTN subscriber is represented within the IP network by a name, and the IP subscriber can address this PSTN subscriber by name, prior to presenting this call to a PSTN switch, the name has to be converted to digits. Of course, the PSTN subscriber may instead or additionally be addressed from within the IP network by regular PSTN directory number.

Consequently, if a first subscriber of a first IP network wishes to call second subscriber, it will be necessary for the first subscriber to use digits in order to route the call in the PSTN-dominated inter-working network arrangement. If the second subscriber is subscriber to a second IP network, then traversing the PSTN provides no benefit but rather limits the connection capabilities to the PSTN capability set, i.e. none of the advanced IP network features such as exchanging data, images or video will be available even though both subscribers are, in fact, IP subscribers.

There are various other scenarios where a connection between two IP subscribers inevitably and undesirably traverses a PSTN network section at least once.

BRIEF SUMMARY OF THE INVENTION

It is therefore an object of the present invention to provide a novel method for establishing calls in a mixed PSTN/IP environment. It is a further object of the invention to provide a novel network arrangement facilitating calls in a mixed PSTN/IP environment. It is yet another object of the invention to provide a novel network node for supporting calls in a mixed PSTN/IP environment.

In accordance with the foregoing objectives, there is provided by the invention a method for establishing a call in a telecommunications network, the telecommunications network comprising a first and a second packet network section, a TDM transit network section coupled to the first and second packet network sections, and a wide area packet network coupled to the first and second packet network sections. The method comprises the steps of:

provides, at a first terminal equipment coupled to said first packet network section, dialed digits, the dialed digits representing a directory number of a second terminal equipment coupled to said second packet network section;

initiating the setup of a first connection through the TDM transit network to the second packet network in accordance with said dialed digits, wherein during call setup at least one message or information element is conveyed to the second packet network section, the at least one message or information element being indicative of the first terminal equipment's packet capabilities and/or an address of a first controlling device controlling the call in the first packet network section;

in the second network, receiving said at least one message or information element at a second controlling device controlling the call in the second packet network section; and establishing, by means of the first and second controlling device and the information extracted from said at least one message or information element, a second connection between the first and second terminal equipment through the wide area packet network.

In a preferred embodiment, TDM transit network section resources utilized during call setup through the TDM transit network are released once the at least one message or information element was transferred.

In another preferred embodiment, the at least one message or information element is further indicative of a vendor of said first terminal equipment. This is useful to allow detection of the vendor of the first terminal equipment in the second network to enable additional vendor specific features and services if, for example, the vendor of the first terminal equipment is also the vendor of the second terminal equipment. In general, the vendor information may be used to indicate the compatibility of terminal equipment with a set of non-standard features and services to allow compatible terminals to make use of such (end-to-end) features and services.

In another preferred embodiment, the at least one message or information element is the user-to-user information (UUI) parameter or the application transport parameter (APP) of the ISUP protocol. These two exemplary parameters allow the transfer of several user specific information types and can, for example, be part of the ISUP message IAM used for setting up the first connection. These parameters may also be used in the ISUP messages ACM and ANM to convey similar information from the second to the first packet network section. Another suitable parameter is known as the network transport parameter. The network transport mechanism may be used to send information through the network transparently, without involving a call setup. The objective is to send parameters end-to-end through the network, without the intermediate exchanges having to process the message.

In an exemplary embodiment, the application transport parameter may convey the first terminal equipment's packet capabilities and/or the address of a first controlling device controlling the call in the first packet network section encoded as ISDN subaddress.

According to the present invention there is also provided a telecommunications network comprising means for executing the inventive method. The invention further provides for a controlling device suitable for packet networks capable of facilitating the inventive method.

One advantage of the present invention lies in its capability to connect packet subscribers, for example, VoIP subscribers, and their advanced terminal equipment via packet network in situations where a calling packet network subscriber (and the calling subscriber's serving network) is not aware of the fact that the called subscriber is also a packet network subscriber and the call is consequently established via a TDM transit networks using dialed digits of a PSTN directory number assigned to the called subscriber.

This, in turn, avoids the multiple protocol conversions occurring when handing the call data from the packet network to the TDM network and back to the packet network, thus improving the quality of the overall connection.

Another advantage of the present invention is that by setting up connections initially over a legacy TDM network, features provided by this legacy network, such as number translation or number portability services, can be provided to the calling IP subscriber.

The invention further allows for releasing the TDM resources once the packet network connection has been established, thus reducing the load of the TDM network. Preferentially, only two messages (the initial setup message, e.g. IAM, and its response, e.g. ACM or REL) need to traverse the TDM network to allow for connecting the packet subscribers via packet network. The present invention also allows the subscribers to use packet network features not supported by legacy TDM connections, such as high-bandwidth, high-quality encoding of voice and video, customized ringing, and visual caller ID.

Depending on regulation imposed by national or international authorities, VoIP calls may be exempt from rigid regulation governing TDM networks.

The present invention may advantageously be used in IP Centrex environments where calling and called subscriber are connected to different branch exchanges.

In the following, the invention will be described in more detail in the form of advantageous embodiments which are better understood in accordance with the enclosed drawings.

DETAILED DESCRIPTION OF THE INVENTION

Figure 1:
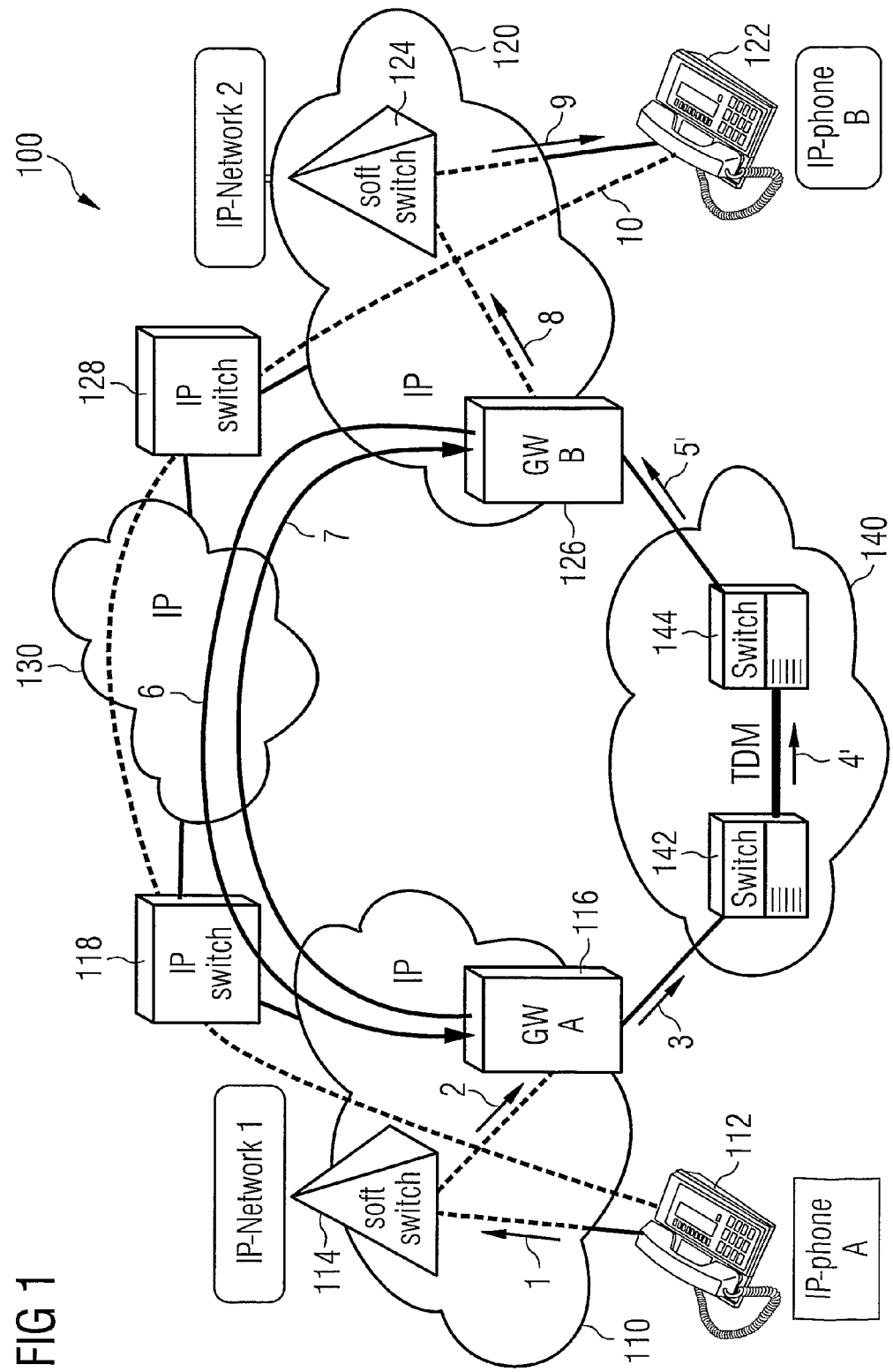
FIG. 1 shows a schematic representation of a network arrangement in accordance with the invention, and a call flow, wherein the call establishment is controlled by means of gateways.

FIG. 1 shows an exemplary telecommunications network 100 in accordance with the invention. Telecommunications network 100 comprises first and second packet network sections 110 and 120, which may be implemented as IP networks. A first packet subscriber's terminal equipment 112 is serviced by the first packet network section 110, and a second packet subscriber's terminal equipment 122 is serviced by the second packet network section 120. The packet network sections 110, 120 employ various network nodes for providing services, such as soft switches 114, 124 and TDM gateways 116, 126. By means of TDM gateways 116, 126 both packet network sections 110, 120 are coupled to a TDM network section 140, which may comprise TDM switching equipment 142, 144 such as (tandem) switching offices, signaling transfer points etc, as is well known in the art. The TDM switching equipment 142, 144 and the interfaces internal to the TDM network 140 may be based on TDM technology or on Asynchronous Transfer Mode (ATM) technology.

Packet network sections 110, 120 are further coupled by means of packet switching equipment 118, 128 to a wide area packet network 130 such as the Internet. Packet switching equipment 118, 128 may comprise routers and switches, as is well known in the art.

In the following, a sequence of events occurring in network 100 will be described with reference to numerals 1-10. It shall be noted that numerals 1-10 do not indicate a complete call flow but rather show general events, messages, and notifications that facilitate the inventive method.

The procedure starts with subscriber A dialing subscriber B's PSTN directory number using, for example, a keypad of first terminal equipment 112, which may be an IP enabled telephone such as a SIP terminal, or any other IP-enabled terminal equipment such as a PC with suitable software. The term "terminal equipment" may also refer to gateways and other routing equipment attempting to establish calls from first IP network 110 to second IP network 120 by utilizing the TDM network 140 routing capabilities.

In step 1, a corresponding setup message, for example a SIP:INVITE message, is generated and provided to first soft switch 114 by means of first packet network section 110.

In step 2, a call agent residing in first soft switch 114 propagates the call setup to first TDM gateway 116.

In step 3, first TDM gateway 116 sends a call setup message to TDM network section 140 using any known TDM signaling protocol such as ISDN, ISDN User Part (ISUP), or Telephone User Part (TUP). This call setup message generated by first TDM gateway 116 contains any information element or parameter that will be propagated transparently through TDM network section 140. In such information element or parameter, the following information will be placed: an indication that first packet network section 110 supports the inventive method; an address, e.g. an IP address, of the controlling device controlling the call in the first packet network section 110, which in this case is first TDM gateway 116; and/or a unique call reference for identifying the call in progress in first gateway 116. It is understood that some of this information may be conveyed implicitly. For example, the presence of the address of the first packet network section controlling device in such information element or parameter may indicate that said controlling device is capable of the inventive method so that a separate indication of this capability may not be necessary.

Exemplary call setup messages are ISDN:SEAUP or ISUP:IAM, which both allow for a parameter called user-to-user information (UUI) and/or an ISDN subaddress, which is conveyed in ISUP using the application transport parameter (APP). These information elements or parameters allow the "user", which in this case is first gateway 116, to specify any information for transport to another user, which in this case is second gateway 126. When using the subaddress parameter, the information to be transferred has to be encoded into numerical format as the subaddress parameter only supports digits. Of course, two or more transport mechanisms may be employed simultaneously to avoid loss of information in such case where any TDM switch along the route through TDM network section 140 should discard either of said transport mechanisms. It is understood that the information may be transported in the application transport parameter (ATP) not only by way of subaddress, but also in any other form supported by the application transport parameter (ATP).

In an alternative embodiment, said information element or parameter is conveyed using any message exchanged after the initial call setup message.

In step 4, the information is transported in TDM network section 140 transparently, in the preferred embodiment by means of ISUP:IAM containing the application transport or user-to-user information parameter.

In step 5, a terminating TDM node 144 sends a call setup message to second TDM gateway 126 using any known TDM signaling protocol such as ISDN, ISDN User Part (ISUP), or Telephone User Part (TUP). This call setup message contains the information element or parameter originally generated by first TDM gateway 116.

In step 6, if second TDM gateway 126 is implemented in accordance with the present invention, second TDM gateway 126 recognizes that first TDM gateway 116 is capable of the inventive method. Second TDM gateway 126 extracts the information from the information element or parameter, e.g. first TDM gateway's IP address and call reference, and uses it for requesting an all-packet connection from second packet network section 120 via second packet switching equipment 128, wide area packet network 130, and first packet switching equipment 118 to first TDM gateway 116 in first packet network section 110. In this connection request, second TDM gateway 126 may specify information such as its own capability set for negotiating connection parameters, its own packet network address, first TDM gateway's call reference, and its own unique call reference for identifying the call in progress in second gateway 126.

In step 7, first TDM gateway 116 responds to the connection request using, for example, a SIP:INVITE message.

In step 8, the connection request is forwarded to second soft switch 124, and more particularly, to a call agent residing in second soft switch 124.

In step 9, the connection request is presented to second subscriber's terminal equipment 122.

Upon acceptance of the incoming connection request, the call may be established in step 10 in an all-packet fashion as indicated by a dashed line.

Optionally, the TDM call may be released at any time during or after step 7 to release the resources utilized for the call setup in TDM network section 140. If the call is not released an ACM message should be returned by TDM gateway 126 to TDM gateway 116 via TDM switch node 144 and TDM node 142.

Figure 2:
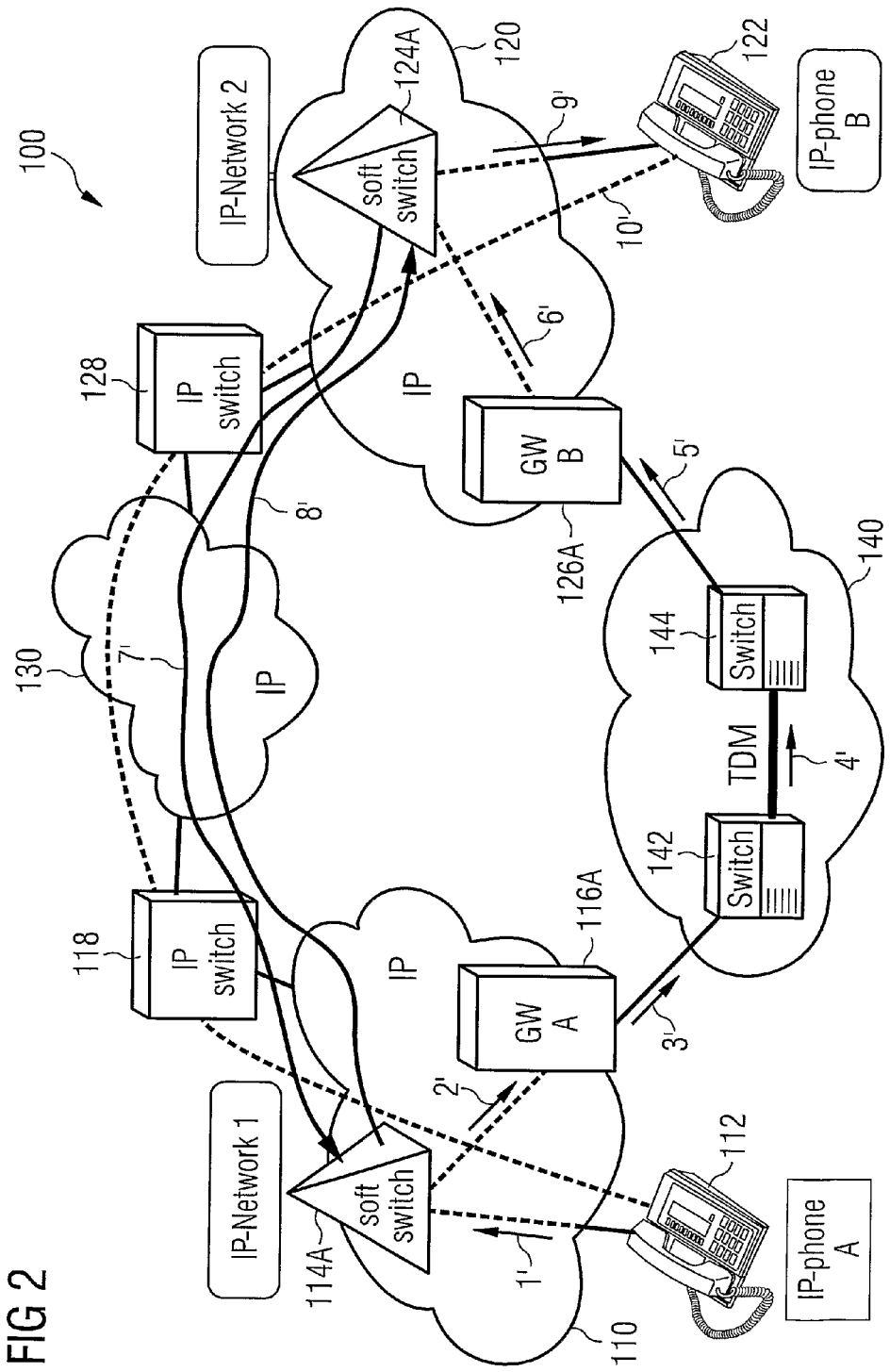
FIG. 2 shows a schematic representation of the network arrangement of FIG. 1, and a call flow, wherein the call establishment is controlled by means of soft switches.

FIG. 2 depicts a network 100' which is essentially similar to network 100 of FIG. 1. In FIG. 2, the capability to perform the present invention does not lie in the TDM gateways 116A, 126A but instead is implemented in the soft switches 114A, 124A.

In the following, a sequence of events occurring in network 100' will be described with reference to numerals 1'-10'. It shall be noted that numerals 1'-10' do not indicate a complete call flow but rather show general events, messages, and notifications that facilitate the inventive method.

The procedure again starts with subscriber A dialing subscriber B's PSTN directory number using, for example, a keypad of first terminal equipment 112, which may be an IP enabled telephone such as a SIP terminal.

In step 1', a corresponding setup message, for example a SIP:INVITE message, is generated and provided to first soft switch 114A by means of first packet network section 110.

In step 2', a call agent residing in first soft switch 114A requests the first TDM gateway 116A to establish a connection to TDM switch 142 and propagates the call setup to first TDM switch 142 via TDM gateway 116A, a separate signaling gateway (not shown) or via a Signaling Transfer Point (STP) (not shown). An STP interconnection between softswitch and TDM switch may be optionally used to transfer SS7 call signaling when the soft switch directly provides SS7 interfaces. A signaling gateway may be optionally used to transfer SS7 call signaling when the soft switch does not provide SS7 interfaces. Otherwise, TDM gateway 116A is used to relay the call signaling.

First soft switch 114A also, in Step 2', transfers the following information to first TDM switch 142 for further transfer to second TDM switch 144 and second soft switch 124A: an indication that first packet network section 110 supports the inventive method; an address, e.g. an IP address, of the controlling device controlling the call in the first packet network section 110, which in this case is first soft switch 114A; and/or a unique call reference for identifying the call in progress in first soft switch 114A. It is understood that some of this information may be conveyed implicitly. For example, the presence of the address of the first packet network section controlling device in such information element or parameter may indicate that said controlling device is capable of the inventive method so that a separate indication of this capability may not be necessary.

In step 3', first TDM switch 142 receives a call setup message generated by softswitch 114A from TDM gateway 116A, from a separate signaling gateway (not shown) or from an STP (not shown) using any known TDM signaling protocol such as ISDN, ISDN User Part (ISUP), or Telephone User Part (TUP). TDM switch 142 translates contained numbers and information for routing and billing purposes. This call setup message contains information elements or parameters that will be propagated transparently through TDM network section 140. The information element transports the information provided by first soft switch 114A.

Exemplary call setup messages are ISDN:SETUP or ISUP: IAM, which both allow for a parameter called user-to-user information (UUI) and/or an ISDN subaddress, which is conveyed in ISUP using the application transport parameter. These information elements or parameters allow the "user", which in this case is first gateway 116A, to specify any information for transport to another user, which in this case is second gateway 126A. When using the subaddress parameter, the information to be transferred has to be encoded into numerical format as the subaddress parameter only supports digits. Of course, two or more transport mechanisms may be employed simultaneously to avoid loss of information in such case where any TDM switch along the route through TDM network section 140 should discard either of said transport mechanisms. It is understood that the information may be transported in the application transport parameter (ATP) not only by way of subaddress, but also in any other form supported by the application transport parameter (ATP).

In an alternative embodiment, said information element or parameter is conveyed using any message exchanged after the initial call setup message.

In step 4', the information is transported in TDM network section 140 transparently, in the preferred embodiment by means of ISUP:IAM containing the application transport or user-to-user information parameter.

In step 5', a terminating TDM node 144 sends a call setup message to second TDM gateway 126A, a second signaling gateway (not shown) or a second STP (not shown) using any known TDM signaling protocol such as ISDN, ISDN User Part (ISUP), or Telephone User Part (TUP). This call setup message contains the information element or parameter originally generated by first TDM gateway 116A.

In step 6', second TDM gateway 126A, second signaling gateway (not shown) or second STP (not shown) forwards the call setup request and the information element to second soft switch 124A.

In step 7', if second soft switch 124A is implemented in accordance with the present invention, second soft switch 124A recognizes that first soft switch 114A is capable of the inventive method. Second soft switch 124A extracts the information from the information element or parameter, e.g. first soft switch's IP address and call reference, and uses it for requesting an all-packet connection from second packet network section 120 via second packet switching equipment 128, wide area packet network 130, and first packet switching equipment 118 to first soft switch 114A in first packet network section 110. In this connection request, second soft switch 124A may specify information such as its own capability set for negotiating connection parameters, its own packet network address, first soft switch's call reference, and its own unique call reference for identifying the call in progress in second soft switch 124A.

In step 8', first soft switch 114A responds to the connection request using, for example, a SIP:INVITE message.

In step 9', the connection request is forwarded to a call agent residing in second soft switch 124A, which then presents the connection request to second subscriber's terminal equipment 122.

Upon acceptance of the incoming connection request, the call may be established in step 10' in an all-packet fashion as indicated by a dashed line.

Optionally the TDM call may be released at any time during or after step 8' to release the resources utilized for the call setup in TDM network section 140. If the call is not released an ACM message should be returned by the second soft switch 124A to first soft switch 114A via TDM network 140 including both TDM switch node 144 and TDM node 142.

In other embodiments of the invention, the teachings of the embodiments according to FIGS. 1 and 2 may be combined such that the inventive method is controlled in a TDM gateway in either of the packet network sections and a soft switch in the other.

In some applications, it may be desirable to complete the TDM call setup and also establish a TDM connection in accordance with known methods. This can easily be accomplished by omitting the optional step of releasing the TDM connection.

From the foregoing detailed description it will be obvious to those with skills in the art how to apply the principles of the present invention to select other suitable controlling devices in packet network sections for controlling the inventive method.

While the invention has been described using the session initiation protocol SIP as an exemplary packet network protocol, other protocols may be employed without departing from the spirit of the present invention. Also, while It will be appreciated that the teachings of the present invention apply in various other network arrangements including, but not limited to, network arrangements including a large number of subscribers, which may also be mobile, and/or network arrangements wherein the wide area packet network and either or both packet network sections form one unique network.

The invention claimed is:

1. A method for establishing a call in a telecommunications network, the telecommunications network comprising a first and a second packet network section, a TDM transit network section coupled to the first and second packet network sections, and a wide area packet network coupled to the first and second packet network sections, the method comprising:

providing, at a first terminal equipment coupled to said first packet network section, dialed digits, the dialed digits representing a directory number of a second terminal equipment coupled to said second packet network section;

initiating the setup of a first connection through the TDM transit network to the second packet network in accordance with said dialed digits, wherein during call setup at least one message or information element is conveyed to the second packet network section, the at least one message or information element being indicative of the first terminal equipment's packet capabilities and/or an address of a first controlling device controlling the call in the first packet network section;

in the second network, receiving said at least one message or information element at a second controlling device controlling the call in the second packet network section; and establishing, by means of the first and second controlling device and the information extracted from said at least one message or information element, a second connection between the first and second terminal equipment through the wide area packet network.

2. The method of claim 1, further comprising the step of releasing the TDM transit network section resources utilized during call setup through the TDM transit network section.

3. The method of claim 1, wherein the at least one message or information element is further indicative of a vendor of said first terminal equipment.

4. The method of claim 1, wherein the at least one message or information element is the user-to-user information parameter or the application transport parameter of the ISUP protocol.

5. The method of claim 4, wherein the application transport parameter conveys the first terminal equipment's packet capabilities and/or the address of a first controlling device controlling the call in the first packet network section encoded as ISDN subaddress.

6. A telecommunications network, comprising:
a first and a second packet network section;
a TDM transit network section coupled to the first and second packet network sections;
a wide area packet network coupled to the first and second packet network sections;
a first terminal equipment coupled to said first packet network section for providing dialed digits, the dialed digits representing a directory number of a second terminal equipment coupled to said second packet network section;
means for initiating the setup of a first connection through the TDM transit network to the second packet network in accordance with said dialed digits, wherein during call setup at least one message or information element is conveyed to the second packet network section, the at least one message or information element being indicative of the first terminal equipment's packet capabilities and/or an address of a first controlling device controlling the call in the first packet network section;
in the second network, means for receiving said at least one message or information element at a second controlling device controlling the call in the second packet network section; and
in the first and/or second controlling device, means for establishing a second connection between the first and second terminal equipment through the wide area packet network in accordance with the information extracted from said at least one message or information element.

7. The telecommunications network of claim 6, further comprising means for releasing the TDM transit network section resources utilized during call setup through the TDM transit network section.

8. The telecommunications network of claim 6, wherein the at least one message or information element is further indicative of a vendor of said first terminal equipment.

9. The telecommunications network of claim 6, wherein the at least one message or information element is the user-to-user information parameter or the application transport parameter of the ISUP protocol.

10. The telecommunications network of claim 9 wherein the application transport parameter conveys the first terminal equipment's packet capabilities and/or the address of a first controlling device controlling the call in the first packet network section encoded as ISDN subaddress.

11. A controlling device for controlling calls in a first packet network section or packet network, comprising:
means for interfacing with a TDM transit network section, said TDM transit network section further coupled to a second packet network section;
means for interfacing with a wide area packet network, said wide area packet network also coupled to said second packet network section;
means for initiating the setup of a first connection through the TDM transit network to the second packet network in accordance with digits dialed at a first terminal equipment coupled to said first packet network section, wherein the dialed digits represent a directory number of a second terminal equipment coupled to said second packet network section and wherein during call setup at least one message or information element is created by the controlling device and conveyed to the second packet network section, the at least one message or information element being indicative of the first terminal equipment's packet capabilities and/or an address of the controlling device such that upon receiving said at least one message or information element at a similar controlling device controlling the call in the second packet network section, a second connection between the first and second terminal equipment through the wide area packet network is establishable in accordance with the information extracted from said at least one message or information element.

12. The controlling device of claim 11, further comprising means for releasing the TDM transit network section resources utilized during call setup through the TDM transit network section.

13. The controlling device of claim 11, wherein the at least one message or information element is further indicative of a vendor of said first terminal equipment (112).

14. The controlling device of claim 11, wherein the at least one message or information element is the user-to-user information parameter or the application transport parameter of the ISUP protocol.

15. The controlling device of claim 14, wherein the application transport parameter conveys the first terminal equipment's packet capabilities and/or the address of a first controlling device controlling the call in the first packet network section encoded as ISDN subaddress.

16. A controlling device for controlling calls in a first packet network section or packet network, comprising:
means for interfacing with a TDM transit network section, said TDM transit network section further coupled to a second packet network section;

means for interfacing with a wide area packet network, said wide area packet network also coupled to said second packet network section;

means for responding to an incoming connection setup received from the TDM transit network but originating from second packet network in accordance with digits dialed at a second terminal equipment coupled to said second packet network section, wherein the dialed digits represent a directory number of a first terminal equipment coupled to said first packet network section and wherein during call setup at least one message or information element created by the controlling device in the second packet network section is conveyed to the controlling device, the at least one message or information element being indicative of the second terminal equipments packet capabilities and/or an address of the controlling device in the second packet network section such that upon receiving said at least one message or information element at controlling device, a second connection between the first and second terminal equipment through the wide area packet network is establishable in accordance with the information extracted from said at least one message or information element.

* * * * *